(12) United States Patent
Chocat

(10) Patent No.: US 10,591,653 B2
(45) Date of Patent: Mar. 17, 2020

(54) LOW CORROSION SOLAR CONTROL STACK

(71) Applicant: SAINT-GOBAIN PERFORMANCE PLASTICS CORPORATION, Solon, OH (US)

(72) Inventor: Noémie Chocat, Courbevoie (FR)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 23 days.

(21) Appl. No.: 15/422,618

(22) Filed: Feb. 2, 2017

(65) Prior Publication Data

US 2017/0227691 A1   Aug. 10, 2017

Related U.S. Application Data

(60) Provisional application No. 62/291,652, filed on Feb. 5, 2016.

(51) Int. Cl.
*G02B 5/26* (2006.01)
*C23C 28/00* (2006.01)

(52) U.S. Cl.
CPC ............... *G02B 5/26* (2013.01); *C23C 28/321* (2013.01); *C23C 28/322* (2013.01); *C23C 28/345* (2013.01); *C23C 28/3455* (2013.01); *Y02B 10/10* (2013.01)

(58) Field of Classification Search
CPC ......... C23C 14/16; C23C 14/20; C23C 14/35; C23C 28/321; C23C 28/322; C23C 28/345; C23C 28/3455; E06B 9/24; G02B 5/26; Y02B 10/10
USPC .................. 428/432, 655, 426, 434, 688
See application file for complete search history.

(56) References Cited

U.S. PATENT DOCUMENTS

| | | | |
|---|---|---|---|
| 6,255,003 | B1 | 7/2001 | Woodard et al. |
| 6,686,050 | B2 | 2/2004 | Lingle et al. |
| 7,241,506 | B2 | 7/2007 | Hartig |
| 7,659,002 | B2 | 2/2010 | Coster et al. |
| 8,231,977 | B2 | 7/2012 | Roquiny et al. |

(Continued)

FOREIGN PATENT DOCUMENTS

| | | |
|---|---|---|
| JP | 2008540311 A | 11/2008 |
| JP | 2008540320 A | 11/2008 |

(Continued)

OTHER PUBLICATIONS

International Search Report and Written Opinion for PCT Application No. PCT/US2017/016129, dated May 12, 2017, 14 pages.

*Primary Examiner* — David Sample
*Assistant Examiner* — Elizabeth Collister
(74) *Attorney, Agent, or Firm* — Abel Schillinger, LLP; Alexander H. Plache

(57) ABSTRACT

A composite stack may include a first substrate layer, a functional layer that includes silver, a first blocker layer that includes a corrosion resistant material and a second blocker layer that includes a blocker material selected from any one of Ti, Ni, Cr, Cu, Al, Mg, NiCr, or alloys thereof. The second blocker layer may be adjacent to the first blocker layer. The composite stack may further have a VLT of at least about 50% and a TSER of at least about 30%. The composite stack may also or in the alternative have an emissivity of not greater than about 20%.

18 Claims, 11 Drawing Sheets

(56) References Cited

U.S. PATENT DOCUMENTS

| | | | |
|---|---|---|---|
| 8,586,215 B2* | 11/2013 | Hartig | C03C 17/36 428/426 |
| 8,613,822 B2 | 12/2013 | Van Dutt et al. | |
| 8,709,604 B2 | 4/2014 | Imran et al. | |
| 8,778,109 B2 | 7/2014 | Van Nutt et al. | |
| 2002/0197459 A1* | 12/2002 | Maurer | C03C 17/36 428/210 |
| 2003/0215622 A1 | 11/2003 | MacQuart et al. | |
| 2004/0137237 A1 | 7/2004 | Stachowiak | |
| 2007/0281171 A1 | 12/2007 | Coster et al. | |
| 2008/0311389 A1* | 12/2008 | Roquiny | C03C 17/36 428/336 |
| 2009/0136765 A1 | 5/2009 | Maschwitz et al. | |
| 2012/0219821 A1 | 8/2012 | Frank et al. | |
| 2014/0272455 A1 | 9/2014 | Ding et al. | |
| 2015/0132555 A1 | 5/2015 | Wuillaume et al. | |

FOREIGN PATENT DOCUMENTS

| | | |
|---|---|---|
| KR | 10-2008-0018887 A | 2/2008 |
| WO | 2013089185 A1 | 6/2013 |

\* cited by examiner

LOW CORROSION SOLAR CONTROL STACK

CROSS-REFERENCE TO RELATED APPLICATION(S)

This application claims priority under 35 U.S.C. § 119(e) to U.S. Provisional Application No. 62/291,652, entitled "LOW CORROSION SOLAR CONTROL STACK," by Noémie Chocat, filed on Feb. 5, 2016, which is assigned to the current assignee hereof and is incorporated herein by reference in its entirety.

FIELD OF THE DISCLOSURE

The present disclosure relates to a composite stack. In particular, the present disclosure relates to a composite stack for application on a transparent substrate where the composite stack has particular solar energy and emissivity characteristics.

BACKGROUND

Composite stacks of thin film layers can be used as coverings applied to windows in buildings or vehicles to provide solar control benefits. For example, desirable solar control benefits may include high visible light transmittance, high total solar energy rejection and or low emissivity. Such composite stacks of thin film layers are traditionally protected by laminating the functional thin film layers of the stack in a protective and optically clear coating that may then be adhered to a transparent substrate, such as a glass window or a plastic substrate. While the lamination improves durability of the composite stack of thin film layers, it also tends to interfere with the solar control benefits of the functional layer in specific wavelengths. As such, a need exists for composite stacks that show high durability while still demonstrating exceptional and desirable solar control benefits without using lamination.

SUMMARY

According to one aspect, a composite stack may include a first substrate layer, at least one functional layer that may include silver, at least a first blocker layer that may include a corrosion resistant material and at least a second blocker layer that may include a blocker material selected from any one of Ti, Ni, Cr, Cu, Al, Mg, NiCr, or alloys thereof. The second blocker layer may be adjacent to the first blocker layer. The composite stack may have a VLT of at least about 50%. The composite stack may further have a TSER of at least about 30%.

According to yet another aspect, a composite stack may include a first substrate layer, at least one functional layer that may include silver, at least a first blocker layer that may include a corrosion resistant material and at least a second blocker layer that may include a blocker material selected from any one of Ti, Ni, Cr, Cu, Al, Mg, NiCr, or alloys thereof. The second blocker layer may be adjacent to the first blocker layer. The composite stack may further have an emissivity of not greater than about 20%.

According to yet another aspect, a method of forming composite stack may include providing a first substrate layer, forming at least one functional layer that may include silver, forming at least a first blocker layer that may include a corrosion resistant material and forming at least a second blocker layer that may include a blocker material selected from any one of Ti, Ni, Cr, Cu, Al, Mg, NiCr, or alloys thereof. The second blocker layer may be formed adjacent to the first blocker layer. The composite stack may have a VLT of at least about 50%. The composite stack may further have a TSER of at least about 30%.

BRIEF DESCRIPTION OF THE DRAWINGS

Embodiments are illustrated by way of example and are not limited in the accompanying figures.

Figure 1:
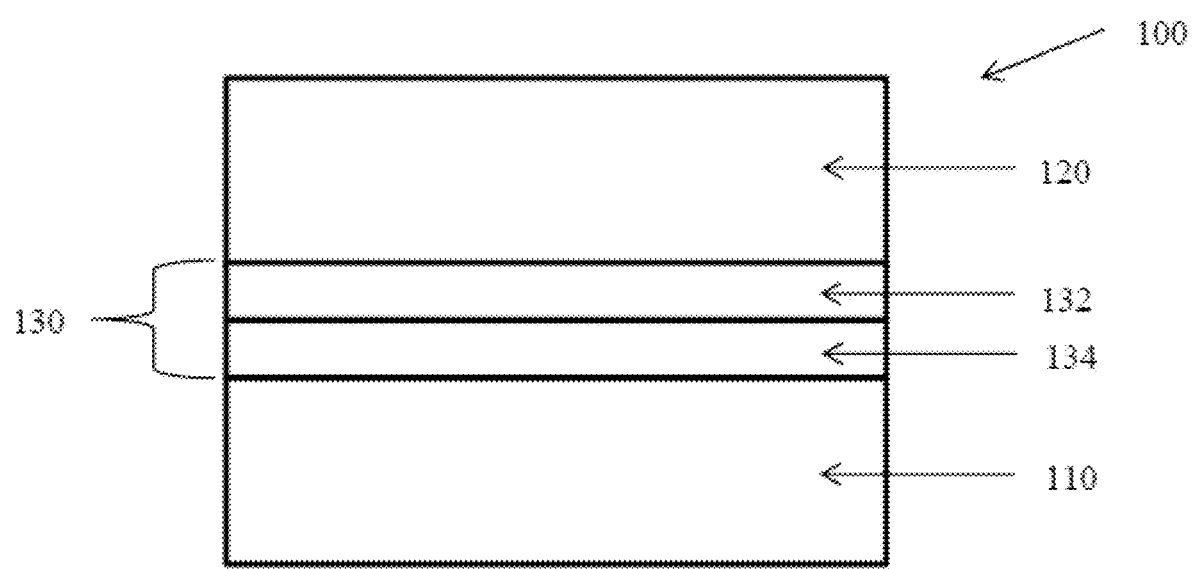
FIG. 1 includes an illustration of an example composite stack according to certain embodiments described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. Further, the use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

As used herein, the term "visible light transmittance" or "VLT" refers to the ratio of total visible light that is transmitted through a composite stack/transparent substrate system and may be calculated using a D65 light source at a 10° angle.

The term "total solar energy rejected" or "TSER" refers to the total solar energy (heat) composite stack/transparent substrate system and may be calculated according to ISO 9050.

The term "emissivity" refers to the percentage of radiant thermal (heat) energy that is reflected by a composite stack/transparent substrate system and may be calculated according to ASTM standard NFRC301.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the solar control arts.

Embodiments described herein are generally directed to composite stacks that include a multi-layer structure having at least one substrate layer, at least one functional layer and at least one dual blocker stack adjacent to the function layer, where the dual blocker stack provides high corrosion resistance while maintaining the functionality of the functional layer. According to particular embodiments, the dual blocker stack may include a first blocker layer that may include a corrosion resistant material and a second blocker layer that is adjacent to the first blocker layer and may include a blocker material selected from any one of Ti, Ni, Cr, Cu, Al, Mg, NiCr, or alloys thereof. The composite stack formed according to embodiments described herein may have particular performance characteristics, such as, low emissivity, high visible light transmittance, high TSER or a combination of thereof.

These concepts are better understood in view of the embodiments described below that illustrate and do not limit the scope of the present disclosure.

FIG. 1 includes an illustration of a cross-sectional view of a portion of an example composite stack 100. As shown in FIG. 1, the composite stack 100 may include a first substrate layer 110, a functional layer 120, a first blocker layer 132 and a second blocker layer 134. The first blocker layer 132 may include a corrosion resistant material. The second blocker layer 134 may be adjacent to the first blocker layer 132 and may include a blocker material selected from any one of Ti, Ni, Cr, Cu, Al, Mg, NiCr, or alloys thereof The first blocker layer 132 and the second blocker layer 134 in combination may be referred to as a first dual blocker stack 130 that may be adjacent to the functional layer 120. According to a particular embodiment, and as shown the FIG. 1, the first dual blocker stack 130 may be located between the first substrate layer 110 and the functional layer 120.

According to an alternative embodiment, the functional layer 120 may be located between the first substrate layer 110 and the first dual blocker stack 130 (not shown in FIG. 1).

Accordingly to still other particular embodiments, and as shown in FIG. 1, the first blocker layer 132 and the second blocker layer 134 may be arranged in the first dual blocker stack 130 such that the first blocker layer 132 is adjacent to the functional layer 120.

According to an alternative embodiment, the first blocker layer 132 and the second blocker layer 134 may be arranged in the first dual blocker stack 130 such that the second blocker layer 134 is adjacent to the functional layer 120 (not shown in FIG. 1).

According to particular embodiments, the first substrate layer 110 may include a polymer material. According to another particular embodiment, the first substrate layer 110 may consist of a polymer material. According to still other embodiments, the first substrate layer 110 may be a polymer substrate layer. According to particular embodiments, the polymer substrate layer may include any desirable polymer material.

According to yet another embodiment, the first substrate layer 110 may include a glass material. According to yet another embodiment, the first substrate layer 110 may consist of a glass material. According to still another embodiment, the first substrate layer 110 may be a glass substrate layer. According to still other embodiments, the glass material may include any desirable glass material.

According to still other embodiments, when the first substrate layer 110 is a polymer substrate layer, it may have a particular thickness. For example, the first substrate layer 110 may have a thickness of at least about 10 microns, such as, at least about 15 microns, at least about 20 microns, at least about 25 microns, at least about 30 microns, at least about 35 microns, at least about 40 microns, at least about 45 microns, at least about 50 microns, at least about 75 microns, at least about 100 micron or even at least about 125 microns. According to still another embodiment, the first substrate layer 110 may have a thickness of not greater than about 250 microns, such as, not greater than about 245 microns, not greater than about 240 microns, not greater than about 235 microns, not greater than about 230 microns, not greater than about 225 microns, not greater than about 220 microns, not greater than about 215 microns, not greater than about 210 microns, not greater than about 205 microns, not greater than about 200 microns, not greater than about 175 microns or even not greater than about 150 microns. It will be appreciated that the first substrate layer 110 may have a thickness within a range between any of minimum and maximum values noted above. It will be further appreciated that the first substrate layer 110 may have a thickness of any value between any of the minimum and maximum values noted above.

It will be further appreciated that when the first substrate layer 110 is a glass substrate layer, it may have any desired thickness.

According to particular embodiments, the functional layer 120 may include silver. According to yet another embodiment, the functional layer 120 may consist essentially of silver. According to still another embodiment, the functional layer 120 may be a silver layer.

According to still other embodiments, the functional layer 120 may have a particular thickness. For example, the functional layer may have a thickness of at least about 5 nanometers, such as, at least about 6 nanometers, at least about 7 nanometers, at least about 8 nanometers, at least about 9 nanometers, at least about 10 nanometers, at least about 12 nanometers, at least about 14 nanometers, at least about 16 nanometers, at least about 18 nanometers, at least about 20 nanometers, at least about 25 nanometers, at least about 30 nanometers or even at least about 35 nanometers. According to still another embodiment, the functional layer 120 may have a thickness of not greater than about 40 nanometers, such as, not greater than about 39 nanometers, not greater than about 38 nanometers, not greater than about 37 nanometers, not greater than about 36 nanometers, not greater than about 35 nanometers, not greater than about 34 nanometers, not greater than about 33 nanometers, not greater than about 32 nanometers or even not greater than about 31 nanometers. It will be appreciated that the functional layer 120 may have a thickness within a range between any of minimum and maximum values noted above. It will be further appreciated that the functional layer 120 may have a thickness of any value between any of the minimum and maximum values noted above.

It will be appreciated that, as used herein, a "functional layer" within a composite stack (i.e., function layer 120) may be distinguished from a "blocker layer" within the composite stack (i.e., blocker layers 132 or 134) based on the particular thickness that allows the functional layer or the blocker layer to fulfill its performance purpose within the composite stack (i.e., low-emissivity layer, corrosion resistance or visible light transmission).

According to another embodiment, the first blocker layer 132 may include a corrosion resistant material. According to still another embodiment, the first blocker layer 132 may consist essentially of a corrosion resistant material. According to yet another embodiment, the first blocker layer 132 may be a corrosion resistant layer. According to particular embodiments, the corrosion resistant material of the first blocker layer 132 may be any noble metal or precious metal, such as, for example, Ruthenium, Rhodium, Palladium, Silver, Osmium, Iridium, Platinum or Gold. According to particular embodiments, the corrosion resistant material of the first blocker layer 132 may be an alloy of any noble metal or precious metal, such as, for example, an alloy of Ruthenium, Rhodium, Palladium, Silver, Osmium, Iridium, Platinum, Gold or combinations thereof. According to still other embodiments, the first blocker layer 132 may include Gold. According to yet other embodiments, the first blocker layer 132 may consist essentially of Gold. According to other embodiments, the first blocker layer 132 may be referred to as a Gold blocker layer.

According to still another embodiment, the first blocker layer 132 may have a particular thickness. For example, the first blocker layer may have a thickness of not greater than about 10 nanometers, such as, not greater than about 9 nanometers, not greater than about 8 nanometers, not greater than about 7 nanometers, not greater than about 6 nanometers, not greater than about 5 nanometers, not greater than about 4.5 nanometers, not greater than about 4 nanometers, not greater than about 3.5 nanometers, not greater than about 3 nanometers, not greater than about 2.8 nanometers, not greater than about 2.6 nanometers, not greater than about 2.4 nanometers, not greater than about 2.2 nanometers, not greater than about 2.0 nanometers, not greater than about 1.8 nanometers, not greater than about 1.6 nanometers, not greater than about 1.4 nanometers, not greater than about 1.2 nanometers, not greater than about 1.0 nanometers, not greater than about 0.8 nanometers, not greater than about 0.6 nanometers, not greater than about 0.5 nanometers, not greater than about 0.4 nanometers, not greater than about 0.3 nanometers or even not greater than about 0.2 nanometers. According to yet another embodiment, the first blocker layer 132 may have a thickness of at least about 0.1 nanometers, such as, at least about 0.2 nanometers, at least about 0.3 nanometers, at least about 0.4 nanometers. It will be appreciated that the first blocker layer 132 may have a thickness within a range between any of minimum and maximum values noted above. It will be further appreciated that the first blocker layer may have a thickness of any value between any of the minimum and maximum values noted above.

According to yet another particular embodiment, the second blocker layer 134 may include any blocker material having a standard potential that is less stable than silver. For example, the second blocker layer 134 may include a blocker material selected from any one of Ti, Ni, Cr, Cu, Al, Mg, NiCr, or alloys thereof. According to still another embodiment, the second blocker layer 134 may include NiCr. According to still other embodiments, the second blocker layer 134 may consist essentially of NiCr. According to yet another embodiment, the second blocker layer 134 may be referred to as a NiCr layer.

According to still another embodiment, the second blocker layer 134 may have a particular thickness. For example, the second blocker layer 134 may have a thickness of not greater than about 10 nanometers, such as, not greater than about 9 nanometers, not greater than about 8 nanometers, not greater than about 7 nanometers, not greater than about 6 nanometers, not greater than about 5 nanometers, not greater than about 4.5 nanometers, not greater than about 4 nanometers, not greater than about 3.5 nanometers, not greater than about 3 nanometers, not greater than about 2.8 nanometers, not greater than about 2.6 nanometers, not greater than about 2.4 nanometers, not greater than about 2.2 nanometers, not greater than about 2.0 nanometers, not greater than about 1.8 nanometers, not greater than about 1.6 nanometers, not greater than about 1.4 nanometers, not greater than about 1.2 nanometers, not greater than about 1.0 nanometers, not greater than about 0.8 nanometers, not greater than about 0.6 nanometers, not greater than about 0.5 nanometers, not greater than about 0.4 nanometers, not greater than about 0.3 nanometers or even not greater than about 0.2 nanometers. According to yet another embodiment, the second blocker layer may have a thickness of at least about 0.1 nanometers, such as, at least about 0.2 nanometers, at least about 0.3 nanometers or even at least about 0.4 nanometers. It will be appreciated that the second blocker layer 134 may have a thickness within a range between any of minimum and maximum values noted above. It will be further appreciated that the second blocker layer 134 may have a thickness of any value within a range between any of the minimum and maximum values noted above.

According to still another embodiment, the composite stack 100 may have a particular emissivity. For example, the composite stack 100 may have an emissivity of not greater than about 20%, such as, not greater than about 18%, not greater than about 15%, not greater than about 13%, not greater than about 13%, not greater than about 10%, not greater than about 9%, not greater than about 8%, not greater than about 7%, not greater than about 6% or even not greater than about 5%. It will be appreciated that the composite stack 100 may have an emissivity within a range between any of the minimum and maximum values noted above. It will be further appreciated that the composite stack 100 may have an emissivity of any value between any of the minimum and maximum values noted above.

According to yet another embodiment, the composite stack 100 may have a particular VLT. For example, the composite stack 100 may have a VLT of at least about 10%, such as, at least about 20%, at least about 30%, at least about 40%, at least about 50%, at least about 60%, at least about 70%, at least about 75%, at least about 80%, at least about 85%, at least about 90%. According to still another embodiment, the composite stack 100 may have a VLT of not greater than about 99%. It will be appreciated that the composite stack 100 may have a VLT within a range between any of minimum and maximum values noted above. It will be further appreciated that the composite stack 100 have a VLT of any value between any of the minimum and maximum values noted above.

According to still another embodiment, the composite stack 100 may have a particular TSER. For example, the composite stack 100 may have a TSER of at least about 30%, such as, at least about 40%, at least about 50%, at least about 60%, at least about 70%, at least about 80% or even at least about 85%. According to yet another embodiment, the composite stack 100 may have a TSER of not greater than about 99%. It will be appreciated that the composite stack 100 may have a TSER within a range between any of minimum and maximum values noted above. It will be further appreciated that the composite stack 100 may have a TSER of any value between any of the minimum and maximum values noted above.

According to yet another embodiment, the composite stack 100 may have a particular thickness ratio $TH_{BL1}/TH_{FL}$ where $TH_{BL1}$ is the thickness of the first blocker layer 132 and $TH_{FL}$ is the thickness of the function layer 120. For example, the composite stack 100 may have a ratio $TH_{BL1}/TH_{FL}$ of not greater than about 5, such as, not greater than about 4, not greater than about 3, not greater than about 2, not greater than about 1, not greater than about 0.9, not greater than about 0.8, not greater than about 0.7, not greater than about 0.6, not greater than about 0.5, not greater than about 0.4, not greater than about 0.3, not greater than about 0.35, not greater than about 0.3, not greater than about 0.25, not greater than about 0.2, not greater than about 0.15, not greater than about 0.1, not greater than about 0.05, not greater than about 0.04, not greater than about 0.03, not greater than about 0.02, even not greater than about 0.01 or even not greater than about 0.005. According to still another embodiment, the composite stack 100 may have a ratio $TH_{BL1}/TH_{FL}$ of at least about 0.002, such as, at least about 0.005, at least about 0.01, at least about 0.02, at least about 0.03, at least about 0.04, at least about 0.05, at least about 0.06, at least about 0.07, at least about 0.08, at least about 0.09, at least about 0.1, at least about 0.2, at about 0.4, at least about 0.5. It will be appreciated that the composite stack 100 may have a ratio $TH_{BL1}/TH_{FL}$ of any value within a range between any of minimum and maximum values noted above. It will be further appreciated that the composite stack 100 may have a ratio $TH_{BL1}/TH_{FL}$ of any value between any of the minimum and maximum values noted above.

According to yet another embodiment, the composite stack 100 may have a particular thickness ratio $TH_{BL2}/TH_{FL}$ where $TH_{BL2}$ is the thickness of the second blocker layer 134 and $TH_{FL}$ is the thickness of the function layer 120. For example, the composite stack 100 may have a ratio $TH_{BL2}/TH_{FL}$ of not greater than about 5, such as, not greater than about 4, not greater than about 3, not greater than about 2, not greater than about 1, not greater than about 0.9, not greater than about 0.8, not greater than about 0.7, not greater than about 0.6, not greater than about 0.5, not greater than about 0.4, not greater than about 0.3, not greater than about 0.35, not greater than about 0.3, not greater than about 0.25, not greater than about 0.2, not greater than about 0.15, not greater than about 0.1, not greater than about 0.05, not greater than about 0.04, not greater than about 0.03, not greater than about 0.02, even not greater than about 0.01 or even not greater than about 0.005. According to still another embodiment, the composite stack 100 may have a ratio $TH_{BL2}/TH_{FL}$ of at least about 0.002, such as, at least about 0.005, at least about 0.01, at least about 0.02, at least about 0.03, at least about 0.04, at least about 0.05, at least about 0.06, at least about 0.07, at least about 0.08, at least about 0.09, at least about 0.1, at least about 0.2, at about 0.4, at least about 0.5. It will be appreciated that the composite stack 100 may have a ratio $TH_{BL2}/TH_{FL}$ of any value within a range between any of minimum and maximum values noted above. It will be further appreciated that the composite stack 100 may have a ratio $TH_{BL2}/TH_{FL}$ of any value between any of the minimum and maximum values noted above.

Figure 2:
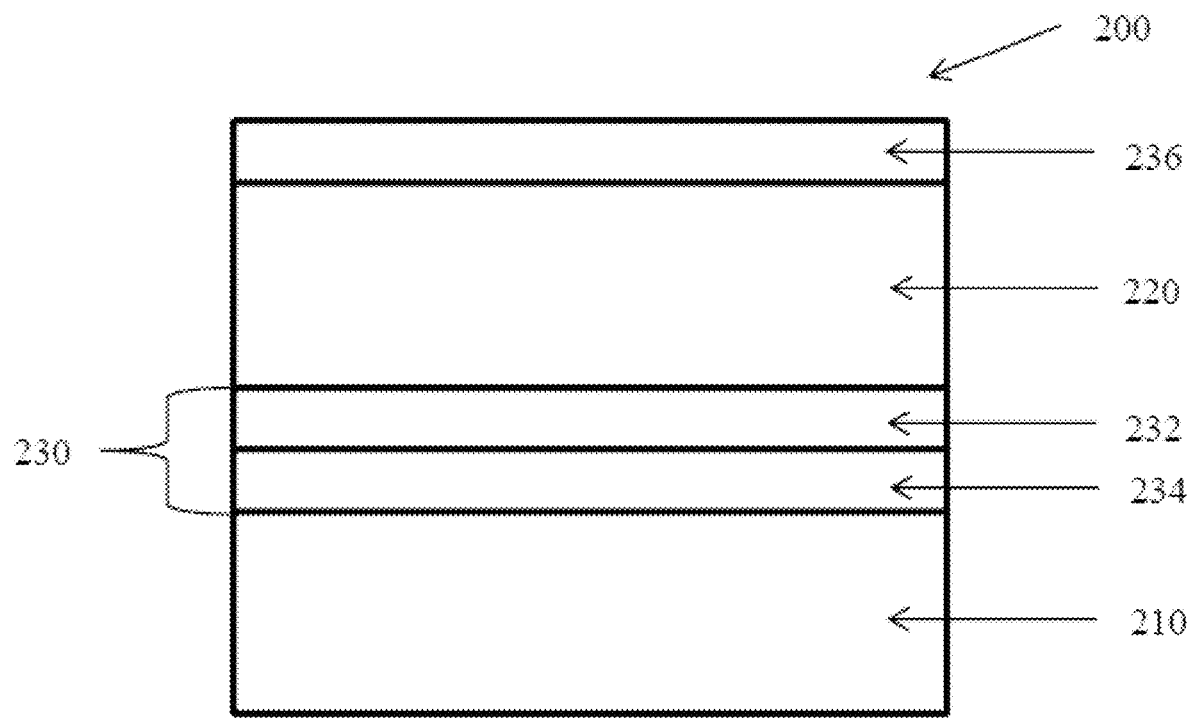
FIG. 2 includes an illustration of another example composite stack according to certain embodiments described herein.

FIG. 2 includes an illustration of a cross-sectional view of a portion of an example composite stack 200. As shown in FIG. 2, the composite stack 200 may include a first substrate layer 210, a functional layer 220, a first blocker layer 232, a second blocker layer 234 and a third blocker layer 236. The first blocker layer 232 may include a corrosion resistant material. The second blocker layer 234 may be adjacent to the first blocker layer 232 and may include a blocker material selected from any one of Ti, Ni, Cr, Cu, Al, Mg, NiCr, or alloys thereof.

The first blocker layer 232 and the second blocker layer 234 in combination may be referred to as a first dual blocker stack 230 that may be adjacent to the functional layer 220. According to a particular embodiment, and as shown the FIG. 2, the first dual blocker stack 230 may be located between the first substrate layer 210 and the functional layer 220 and the third blocker layer 236 may also be adjacent to the functional layer 220 such that the functional layer 220 and the dual blocker stack 230 may be between the third blocker layer 236 and the first substrate 210.

According to still another particular embodiment, the third blocker layer 236 may be located between the first substrate layer 210 and the functional layer 220 and the first dual blocker stack 230 may also be adjacent to the functional layer 220 such that the functional layer 220 and the third blocker layer 236 may be between the first dual blocker stack 230 and the first substrate 210 (not shown in FIG. 2).

Accordingly to still other particular embodiments, and as shown in FIG. 2, the first blocker layer 232 and the second blocker layer 234 may be arranged in the first dual blocker stack 230 such that the first blocker layer 232 is adjacent to the functional layer 220.

According to still other embodiments, the first blocker layer 232 and the second blocker layer 234 may be arranged in the first dual blocker stack 230 such that the second blocker layer 234 is adjacent to the functional layer 220 (not shown in FIG. 2).

It will be appreciated that the composite stack 200, first substrate layer 210, functional layer 220, first blocker layer 232, second blocker layer 234 and first dual blocker stack 230 may have any of the characteristics described herein with reference to corresponding layers in FIG. 1.

According to a particular embodiment, the third blocker layer 236 may include a corrosion resistant material. According to still another embodiment, the third blocker layer 236 may consist essentially of a corrosion resistant material. According to yet another embodiment, the third blocker layer 236 may be a corrosion resistant layer. According to particular embodiments, the corrosion resistant material of the third blocker layer 236 may be any noble or precious metal, such as, for example, Ruthenium, Rhodium, Palladium, Silver, Osmium, Iridium, Platinum or Gold. According to still other embodiments, the third blocker layer 236 may include Gold. According to yet other embodiments, the third blocker layer 236 may consist essentially of Gold. According to other embodiments, the third blocker layer 236 may be referred to as a Gold blocker layer.

According to yet another particular embodiment, the third blocker layer 236 may include any blocker material having a standard potential that is less stable that silver. For example, the third blocker layer 236 may include a blocker material selected from any one of Ti, Ni, Cr, Cu, Al, Mg, NiCr, or alloys thereof. According to still another embodiment, the third blocker layer 236 may include NiCr. According to still other embodiments, the third blocker layer 236 may consist essentially of NiCr. According to yet another embodiment, the third blocker layer 236 may be referred to as a NiCr layer.

According to still another embodiment, the third blocker layer 236 may have a particular thickness. For example, the third blocker layer 236 may have a thickness of not greater than about 10 nanometers, such as, not greater than about 9 nanometers, not greater than about 8 nanometers, not greater than about 7 nanometers, not greater than about 6 nanometers, not greater than about 5 nanometers, not greater than about 4.5 nanometers, not greater than about 4 nanometers, not greater than about 3.5 nanometers, not greater than about 3 nanometers, not greater than about 2.8 nanometers, not greater than about 2.6 nanometers, not greater than about 2.4 nanometers, not greater than about 2.2 nanometers, not greater than about 2.0 nanometers, not greater than about 1.8 nanometers, not greater than about 1.6 nanometers, not greater than about 1.4 nanometers, not greater than about 1.2 nanometers, not greater than about 1.0 nanometers, not greater than about 0.8 nanometers, not greater than about 0.6 nanometers, not greater than about 0.5 nanometers, not greater than about 0.4 nanometers, not greater than about 0.3 nanometers or even not greater than about 0.2 nanometers. According to yet another embodiment, the third blocker layer 236 may have a thickness of at least about 0.1 nanometers, at least about 0.2 nanometers, at least about 0.3 nanometers, such as, at least about 0.4 nanometers. It will be appreciated that the third blocker layer 236 may have a thickness within a range between any of minimum and maximum values noted above. It will be further appreciated that the third blocker layer 236 may have a thickness of any value within any of the minimum and maximum values noted above.

According to yet another embodiment, the composite stack 200 may have a particular thickness ratio $TH_{BL3}/TH_{FL}$ where $TH_{BL2}$ is the thickness of the third blocker layer 236 and $TH_{FL}$ is the thickness of the functional layer 220. For example, the composite stack 200 may have a ratio $TH_{BL2}/TH_{FL}$ of not greater than about 5, such as, not greater than about 4, not greater than about 3, not greater than about 2, not greater than about 1, not greater than about 0.9, not greater than about 0.8, not greater than about 0.7, not greater than about 0.6, not greater than about 0.5, not greater than about 0.4, not greater than about 0.3, not greater than about 0.35, not greater than about 0.3, not greater than about 0.25, not greater than about 0.2, not greater than about 0.15, not greater than about 0.1, not greater than about 0.05, not greater than about 0.04, not greater than about 0.03, not greater than about 0.02, even not greater than about 0.01 or even not greater than about 0.005. According to still another embodiment, the composite stack 200 may have a ratio $TH_{BL3}/TH_{FL}$ of at least about 0.002, such as, at least about 0.005, at least about 0.01, at least about 0.02, at least about 0.03, at least about 0.04, at least about 0.05, at least about 0.06, at least about 0.07, at least about 0.08, at least about 0.09, at least about 0.1, at least about 0.2, at about 0.4, at least about 0.5. It will be appreciated that the composite stack 200 may have a ratio $TH_{BL2}/TH_{FL}$ of any value within a range between any of minimum and maximum values noted above. It will be further appreciated that the composite stack 200 may have a ratio $TH_{BL2}/TH_{FL}$ of any value between any of the minimum and maximum values noted above.

Figure 3:
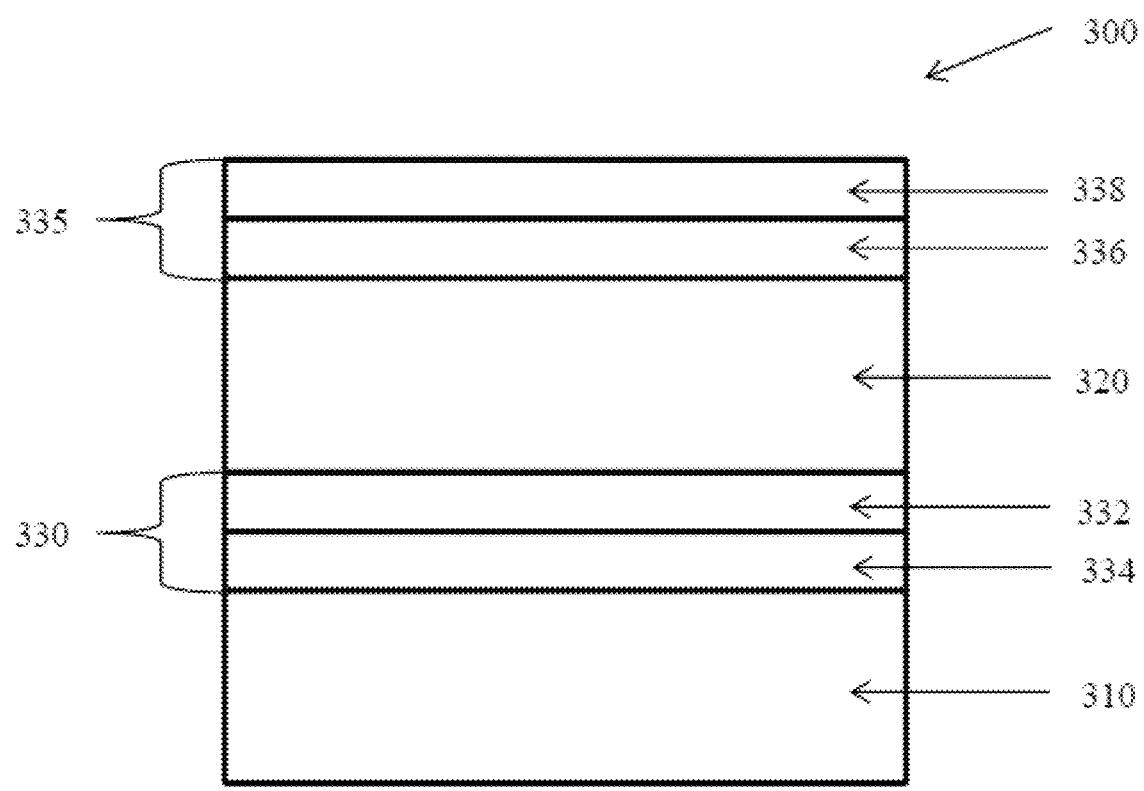
FIG. 3 includes an illustration of another example composite stack according to certain embodiments described herein FIG. 4 includes an illustration of another example composite stack according to certain embodiments described herein.

FIG. 3 includes an illustration of a cross-sectional view of a portion of an example composite stack 300. As shown in FIG. 3, the composite stack 300 may include a first substrate layer 310, a functional layer 320, a first blocker layer 332, a second blocker layer 334, a third blocker layer 336 and a fourth blocker layer 338. The first blocker layer 332 may include a corrosion resistant material. The second blocker layer 334 may be adjacent to the first blocker layer 332 and may include a blocker material selected from any one of Ti, Ni, Cr, Cu, Al, Mg, NiCr, or alloys thereof. The third blocker layer 336 may include a corrosion resistant material. The fourth blocker layer 338 may be adjacent to the third blocker layer 336 and may include a blocker material selected from any one of Ti, Ni, Cr, Cu, Al, Mg, NiCr, or alloys thereof.

The first blocker layer 332 and the second blocker layer 334 in combination may be referred to as a first dual blocker stack 330 that may be adjacent to the functional layer 320. The third blocker layer 336 and the fourth blocker layer 338 in combination may be referred to as a second dual blocker stack 335. According to a particular embodiment, and as shown the FIG. 3, the first dual blocker stack 330 may be located between the first substrate layer 310 and the functional layer 320 and the second dual blocker stack 335 may also be adjacent to the functional layer 320 such that the functional layer 320 and the dual blocker stack 330 may be between the second dual blocker stack 335 and the first substrate 310.

Accordingly to still other particular embodiments, and as shown in FIG. 3, the first blocker layer 332 and the second blocker layer 334 may be arranged in the first dual blocker stack 330 such that the first blocker layer 332 is adjacent to the functional layer 320.

According to still other embodiments, the first blocker layer 332 and the second blocker layer 334 may be arranged in the first dual blocker stack 330 such that the second blocker layer 334 is adjacent to the functional layer 320 (not shown in FIG. 3).

Accordingly to still other particular embodiments, and as shown in FIG. 3, the third blocker layer 336 and the fourth blocker layer 338 may be arranged in the second dual blocker stack 335 such that the third blocker layer 336 is adjacent to the functional layer 320.

According to still other embodiments, the third blocker layer 336 and the fourth blocker layer 338 may be arranged in the second dual blocker stack 335 such that the fourth blocker layer 338 is adjacent to the functional layer 320 (not shown in FIG. 3).

It will be appreciated that the composite stack 300, first substrate layer 310, functional layer 320, first blocker layer 332, second blocker layer 334 and third blocker layer 336 may have any of the characteristics described herein with reference to corresponding layers in FIG. 1 or 2.

According to a particular embodiment, the third blocker layer 336 may include a corrosion resistant material. According to still another embodiment, the third blocker layer 336 may consist essentially of a corrosion resistant material. According to yet another embodiment, the third blocker layer 336 may be a corrosion resistant layer. According to particular embodiments, the corrosion resistant material of the third blocker layer 336 may be any noble or precious metal, such as, for example, Ruthenium, Rhodium, Palladium, Silver, Osmium, Iridium, Platinum or Gold. According to particular embodiments, the corrosion resistant material of the third blocker layer 336 may be an alloy of any noble metal or precious metal, such as, for example, an alloy of Ruthenium, Rhodium, Palladium, Silver, Osmium, Iridium, Platinum, Gold or combinations thereof. According to still other embodiments, the third blocker layer 336 may include Gold. According to yet other embodiments, the third blocker layer 336 may consist essentially of Gold. According to other embodiments, the third blocker layer 336 may be referred to as a Gold blocker layer.

According to yet another particular embodiment, the fourth blocker layer 338 may include any blocker material having a standard potential that is less stable that silver. For example, the fourth blocker layer 338 may include a blocker material selected from any one of Ti, Ni, Cr, Cu, Al, Mg, NiCr, or alloys thereof. According to still another embodiment, the fourth blocker layer 338 may include NiCr. According to still other embodiments, the fourth blocker layer 338 may consist essentially of NiCr. According to yet another embodiment, the fourth blocker layer 338 may be referred to as a NiCr layer.

According to still another embodiment, the fourth blocker layer 338 may have a particular thickness. For example, the fourth blocker layer 338 may have a thickness of not greater than about 10 nanometers, such as, not greater than about 9 nanometers, not greater than about 8 nanometers, not greater than about 7 nanometers, not greater than about 6 nanometers, not greater than about 5 nanometers, not greater than about 4.5 nanometers, not greater than about 4 nanometers, not greater than about 3.5 nanometers, not greater than about 3 nanometers, not greater than about 2.8 nanometers, not greater than about 2.6 nanometers, not greater than about 2.4 nanometers, not greater than about 2.2 nanometers, not greater than about 2.0 nanometers, not greater than about 1.8 nanometers, not greater than about 1.6 nanometers, not greater than about 1.4 nanometers, not greater than about 1.2 nanometers, not greater than about 1.0 nanometers, not greater than about 0.8 nanometers, not greater than about 0.6 nanometers, not greater than about 0.5 nanometers, not greater than about 0.4 nanometers, not greater than about 0.3 nanometers or even not greater than about 0.2 nanometers. According to yet another embodiment, the fourth blocker layer 338 may have a thickness of at least about 0.1 nanometers, at least about 0.2 nanometers, at least about 0.3 nanometers, such as, at least about 0.4 nanometers. It will be appreciated that the fourth blocker layer 338 may have a thickness within a range between any of minimum and maximum values noted above. It will be further appreciated that the fourth blocker layer 338 may have a thickness of any value between any of the minimum and maximum values noted above.

Figure 4:
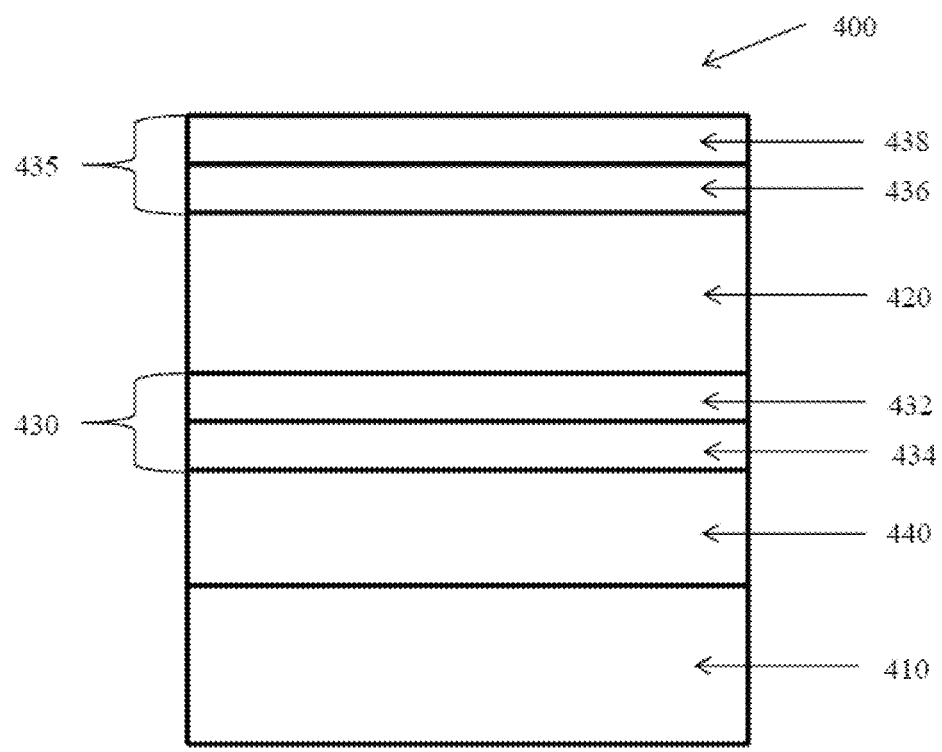

FIG. 4 includes an illustration of a cross-sectional view of a portion of an example composite stack 400. As shown in FIG. 4, the composite stack 400 may include a first substrate layer 410, a functional layer 420, a first blocker layer 432, a second blocker layer 434, a third blocker layer 436, a fourth blocker layer 438 and a first dielectric layer 440. The first blocker layer 432 may include a corrosion resistant material. The second blocker layer 434 may be adjacent to the first blocker layer 432 and may include a blocker material selected from any one of Ti, Ni, Cr, Cu, Al, Mg, NiCr, or alloys thereof. The first blocker layer 432 and the second blocker layer 434 in combination may be referred to as a first dual blocker stack 430 that may be adjacent to the functional layer 420. The third blocker layer 436 may include a corrosion resistant material. The fourth blocker layer 438 may be adjacent to the third blocker layer 436 and may include a blocker material selected from any one of Ti, Ni, Cr, Cu, Al, Mg, NiCr, or alloys thereof. The third blocker layer 436 and the fourth blocker layer 438 in combination may be referred to as a second dual blocker stack 435 that may be adjacent to the functional layer 420 such that the function layer 420 may be between the first dual blocker stack 430 and the second dual blocker stack 435. The first dielectric layer 440 may be located between first dual blocker stack 430 and the first substrate layer 410.

It will be appreciated that the composite stack 400, first substrate layer 410, functional layer 420, first blocker layer 432, second blocker layer 434, first dual blocker stack 430, third blocker layer 436, fourth blocker layer 438 and second dual blocker stack 435 may have any of the characteristics described herein with reference to corresponding layers in FIG. 1, 2 or 3.

It will be further appreciated that according to alternative embodiments, a first dielectric layer 440 may be included in any of the composite stacks shown in FIG. 1, 2 or 3.

According to certain embodiments, the first dielectric layer 440 may include a dielectric material. According to still other embodiments, the first dielectric layer 440 may consist essentially of a dielectric material. The dielectric material of the first dielectric layer 440 may be any known transparent dielectric material. For example, the transparent dielectric material may be a mixture, in any proportion, of indium (In) oxide, tin (Sn) oxide, or indium tin oxide (ITO). According to still other embodiments, the dielectric material may include the respective pure oxides of indium oxide, tin oxide or indium tin oxide, possibly under-stoichiometric in oxygen, and possibly doped with another atom (e.g., Sb). According to yet other embodiments, the transparent dielectric material may include any mixture in any proportion of Sn oxide and Zn oxide ($SnZnO_x$), including the pure oxides, possibly under-stoichiometric in oxygen and possibly doped with another atom (e.g., In, Ga, Al), with a dopant weight content below 20%. According to still other embodiments, the transparent dielectric material may include Si oxide, Si nitride, or any composition of Si oxynitride. According to yet other embodiments, the dielectric material may include any stoichiometric or under-stoichiometric form of Ti oxide (i.e., $TiO_x$, $1<x<2$). According to still other embodiments, the dielectric material may include any stoichiometric or under-stoichiometric form of Nb oxide (i.e., $NbO_x$, $1<x<2.5$). According to yet other embodiments, the dielectric material may include any one of ITO, $Sn_xZn_yO_z$, $SiO_2$, $Si_3N_4$, $Nb_2O_5$, $TiO_2$, $TiO_x$, $In_2O_3$, AZO or combinations thereof.

According to yet another embodiment, the first dielectric layer 440 may have a particular thickness. For example, the first dielectric layer 440 may have a thickness of not greater than about 200 nanometers, such as, not greater than about 190 nanometers, not greater than about 180 nanometers, not greater than about 170 nanometers, not greater than about 160 nanometers, not greater than about 150 nanometers, not greater than about 140 nanometers, not greater than about 130 nanometers, not greater than about 120 nanometers, not greater than about 110 nanometers, not greater than about 100 nanometers, not greater than about 95 nanometers, not greater than about 90 nanometers, not greater than about 85 nanometers, not greater than about 80 nanometers, not greater than about 75 nanometers, not greater than about 70 nanometers, not greater than about 65 nanometers, not greater than about 60 nanometers, not greater than about 55 nanometers, not greater than about 50 nanometers, not greater than about 45 nanometers, not greater than about 40 nanometers, not greater than about 35 nanometers, not greater than about 30 nanometers, not greater than about 30 nanometers, not greater than about 25 nanometers, not greater than about 20 nanometers or even not greater than about 15. According to still another embodiment, the first dielectric layer 440 may have a thickness of at least about 3 nanometers, such as, at least about 5 nanometers, at least about 8 nanometers, at least about 10 nanometers, at least about 20 nanometers, at least about 25 nanometers or even at least about 30 nanometers. It will be appreciated that the first dielectric layer 440 may have a thickness within a range between any of minimum and maximum values noted above. It will be further appreciated that the first dielectric layer 440 may have a thickness of any value between any of the minimum and maximum values noted above.

Figure 5:
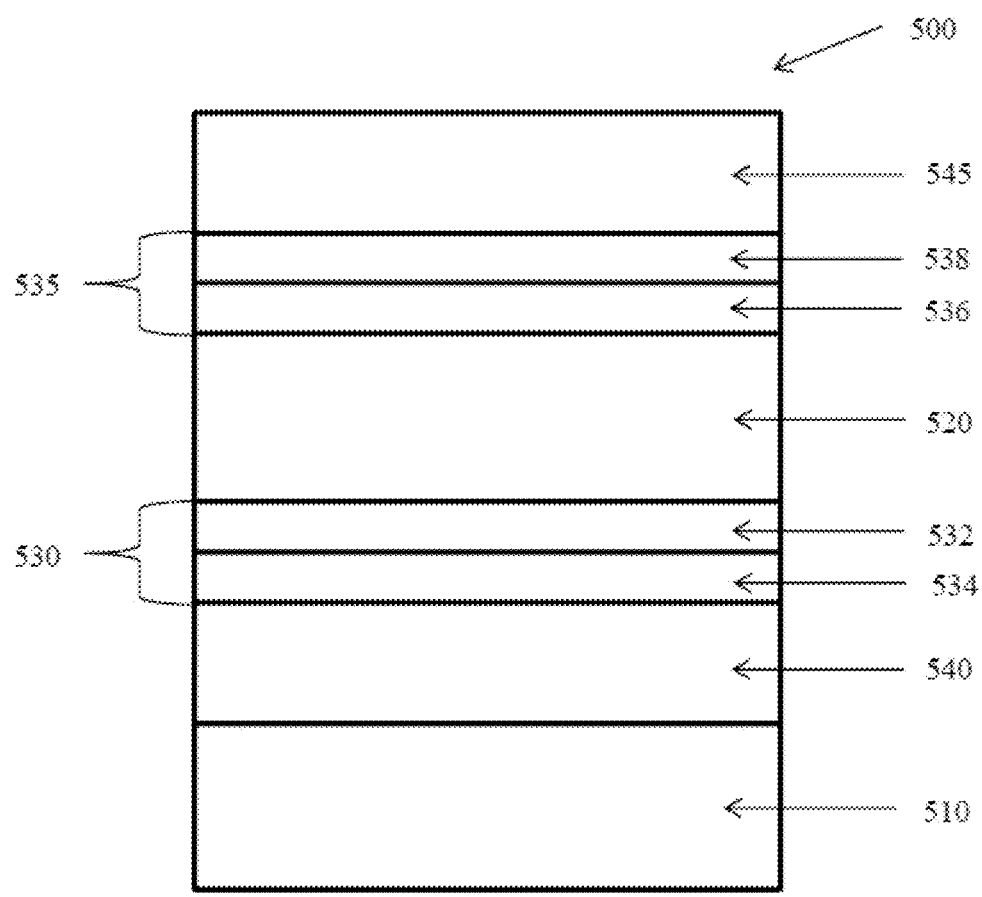
FIG. 5 includes an illustration of another example composite stack according to certain embodiments described herein.

FIG. 5 includes an illustration of a cross-sectional view of a portion of an example composite stack 500. As shown in FIG. 5, composite stack 500 may include a first substrate layer 510, a functional layer 520, a first blocker layer 532, a second blocker layer 534, a third blocker layer 536, a fourth blocker layer 538, a first dielectric layer 540 and a second dielectric layer 545. The first blocker layer 532 may include a corrosion resistant material. The second blocker layer 534 may be adjacent to the first blocker layer 532 and may include a blocker material selected from any one of Ti, Ni, Cr, Cu, Al, Mg, NiCr, or alloys thereof. The first blocker layer 532 and the second blocker layer 534 in combination may be referred to as a first dual blocker stack 530 that may be adjacent to the functional layer 520. The third blocker layer 536 may include a corrosion resistant material. The fourth blocker layer 538 may be adjacent to the third blocker layer 536 and may include a blocker material selected from any one of Ti, Ni, Cr, Cu, Al, Mg, NiCr, or alloys thereof. The third blocker layer 536 and the fourth blocker layer 538 in combination may be referred to as a second dual blocker stack 535 that may be adjacent to the functional layer 520 such that the function layer 520 may be between the first dual blocker stack 530 and the second dual blocker stack 535. The first dielectric layer 540 may be located between the first dual blocker stack 530 and the first substrate layer 510. The second dielectric layer 545 may be located adjacent to the second dual blocker stack 535 such that the second dual blocker stack 535 is between the second dielectric layer 545 and the functional layer 520.

It will be appreciated that the composite stack 500, first substrate layer 510, functional layer 520, first blocker layer 532, second blocker layer 534, first dual blocker stack 530, third blocker layer 536, fourth blocker layer 538, second dual blocker stack 535 and first dielectric layer 540 may have any of the characteristics described herein with reference to corresponding layers in FIG. 1, 2, 3 or 4.

It will be further appreciated that according to alternative embodiments, a second dielectric layer 545 may be included in any of the composite stacks shown in FIG. 1, 2, 3 or 4.

According to certain embodiments, the second dielectric layer 545 may include a dielectric material. According to still other embodiments, the second dielectric layer 545 may consist essentially of a dielectric material. The dielectric material of the second dielectric layer 545 may be any known transparent dielectric material. For example, the transparent dielectric material may be a mixture, in any proportion, of indium (In) oxide, tin (Sn) oxide, or indium tin oxide (ITO). According to still other embodiments, the dielectric material may include the respective pure oxides of indium oxide, tin oxide or indium tin oxide, possibly under-stoichiometric in oxygen, and possibly doped with another atom (e.g., Sb). According to yet other embodiments, the transparent dielectric material may include any mixture in any proportion of Sn oxide and Zn oxide ($SnZnO_x$), including the pure oxides, possibly under-stoichiometric in oxygen and possibly doped with another atom (e.g., In, Ga, Al), with a dopant weight content below 20%. According to still other embodiments, the transparent dielectric material may include Si oxide, Si nitride, or any composition of Si oxynitride. According to yet other embodiments, the dielectric material may include any stoichiometric or under-stoichiometric form of Ti oxide (i.e., $TiO_x$, $1<x<2$). According to still other embodiments, the dielectric material may include any stoichiometric or under-stoichiometric form of Nb oxide (i.e., $NbO_x$, $1<x<2.5$). According to yet other embodiments, the dielectric material may include any one of ITO, $Sn_xZn_yO_z$, $SiO_2$, $Si_3N_4$, $Nb_2O_5$, $TiO_2$, $TiO_x$, $In_2O_3$, AZO or combinations thereof.

According to yet another embodiment, the second dielectric layer 545 may have a particular thickness. For example, the second dielectric layer may have a thickness of not greater than about 200 nanometers, such as, not greater than about 190 nanometers, not greater than about 180 nanometers, not greater than about 170 nanometers, not greater than about 160 nanometers, not greater than about 150 nanometers, not greater than about 140 nanometers, not greater than about 130 nanometers, not greater than about 120 nanometers, not greater than about 110 nanometers, not greater than about 100 nanometers, not greater than about 95 nanometers, not greater than about 90 nanometers, not greater than about 85 nanometers, not greater than about 80 nanometers, not greater than about 75 nanometers, not greater than about 70 nanometers, not greater than about 65 nanometers, not greater than about 60 nanometers, not greater than about 55 nanometers, not greater than about 50 nanometers, not greater than about 45 nanometers, not greater than about 40 nanometers, not greater than about 35 nanometers, not greater than about 30 nanometers, not greater than about 30 nanometers, not greater than about 25 nanometers, not greater than about 20 nanometers or even not greater than about 15. According to still another embodiment, the second dielectric layer may have a thickness of at least about 3 nanometers, such as, at least about 5 nanometers, at least about 8 nanometers, at least about 10 nanometers, at least about 20 nanometers, at least about 25 nanometers or even at least about 30 nanometers. It will be appreciated that the second dielectric layer may have a thickness within a range between any of minimum and maximum values noted above. It will be further appreciated that the second dielectric layer may have a thickness of any value within a range between any of the minimum and maximum values noted above.

Figure 6:
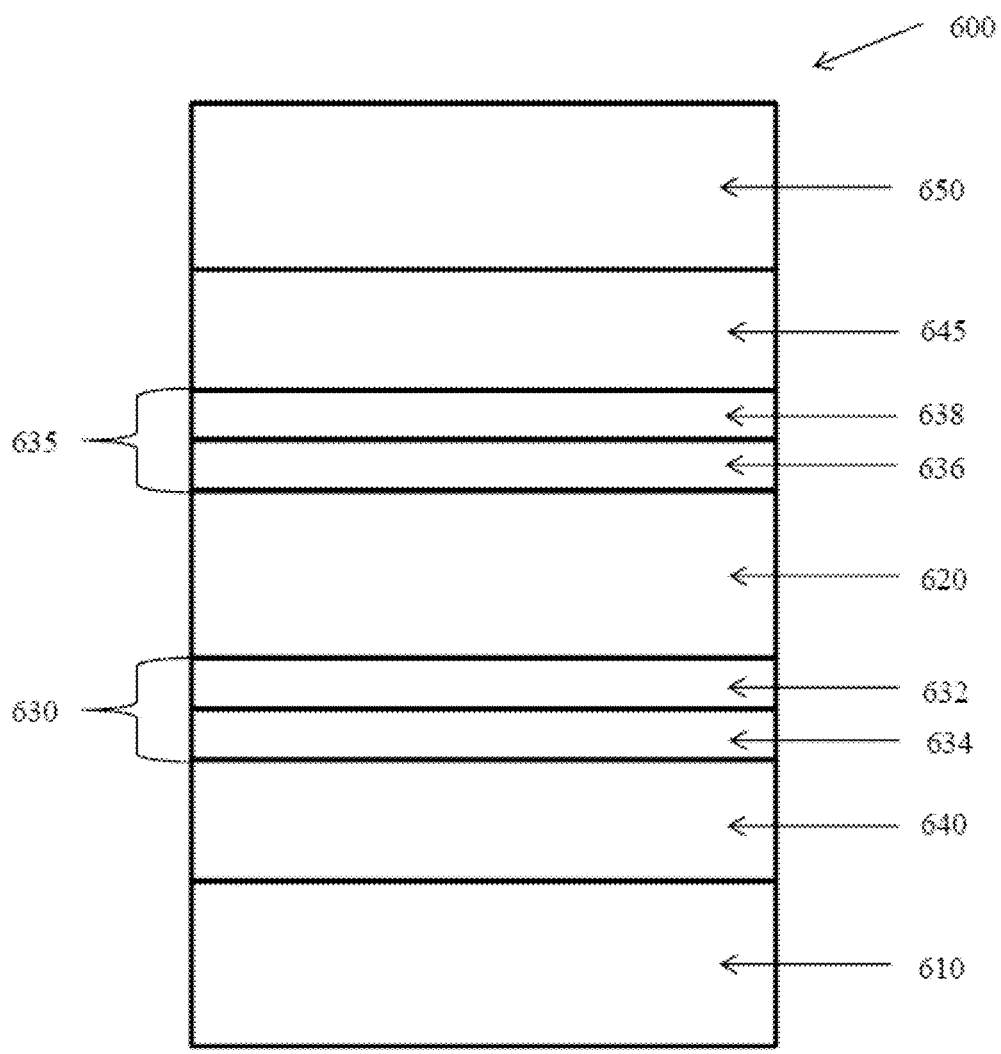
FIG. 6 includes an illustration of another example composite stack according to certain embodiments described herein.

FIG. 6 includes an illustration of a cross-sectional view of a portion of an example composite stack 600. As shown in FIG. 6, composite stack 600 may include a first substrate layer 610, a functional layer 620, a first blocker layer 632, a second blocker layer 634, a third blocker layer 636, a fourth blocker layer 638, a first dielectric layer 640, a second dielectric layer 645 and a second substrate layer 650. The first blocker layer 632 may include a corrosion resistant material. The second blocker layer 634 may be adjacent to the first blocker layer 632 and may include a blocker material selected from any one of Ti, Ni, Cr, Cu, Al, Mg, NiCr, or alloys thereof. The first blocker layer 632 and the second blocker layer 634 in combination may be referred to as a first dual blocker stack 630 that may be adjacent to the functional layer 620. The third blocker layer 636 may include a corrosion resistant material. The fourth blocker layer 638 may be adjacent to the third blocker layer 636. The third blocker layer 636 and the fourth blocker layer 638 in combination may be referred to as a second dual blocker stack 635 that may be adjacent to the functional layer 620 such that the function layer 620 may be between the first dual blocker stack 630 and the second dual blocker stack 635. The first dielectric layer 640 may be located between the first dual blocker stack 630 and the first substrate layer 610. The second dielectric layer 645 may be located adjacent to the second dual blocker stack 635 such that the second dual blocker stack 635 is between the second dielectric layer 645 and the functional layer 620.

It will be appreciated that the composite stack 600, first substrate layer 610, functional layer 620, first blocker layer 632, second blocker layer 634, first dual blocker stack 630, third blocker layer 636, fourth blocker layer 638, second dual blocker stack 635, first dielectric layer 640 and second dielectric layer 645 may have any of the characteristics described herein with reference to corresponding layers in FIG. 1, 2, 3, 4 or 5.

It will be further appreciated that according to alternative embodiments, a second substrate layer 650 may be included in any of the composite stacks shown in FIG. 1, 2, 3, 4 or 5.

According to particular embodiments, the second substrate layer 650 may include a polymer material. According to another particular embodiment, the second substrate layer 650 may consist of a polymer material. According to still other embodiments, the second substrate layer 650 may be a polymer substrate layer. According to particular embodiments, the polymer substrate layer may include any desirable polymer material.

According to yet another embodiment, the second substrate layer 650 may include a glass material. According to yet another embodiment, the second substrate layer 650 may consist of a glass material. According to still another embodiment, the second substrate layer 650 may be a glass substrate layer. According to particular embodiments, the glass substrate layer may include any desirable glass material.

According to still other embodiments, the second substrate layer 650 may be adhered to the rest of the layers in the composite stack 600 using an adhesive material. According to still other embodiments, the adhesive material may be any known adhesive materials. According to still other embodiments, the adhesive material may be any acrylic based adhesive. According to yet another embodiment, the adhesive material may be any silicone based adhesive.

According to particular embodiments, all layers of the composite stack formed on or between the first and second substrates as described herein may be formed using any suitable technique. For example, all layers of the composite stack formed on or between the first and second substrates as described herein may be formed using magnetron sputtering. According to still other embodiments, all layers of the composite stack formed on or between the first and second substrates as described herein may be formed using physical vapor deposition.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A composite stack comprising: a first substrate layer; a functional layer comprising silver; a first blocker layer comprising a corrosion resistant material; and a second blocker layer comprising NiCr, wherein the second blocker layer is adjacent to the first blocker layer; and wherein the composite stack has a VLT of at least about 50% and a TSER of at least about 30%.

Embodiment 2

A composite stack comprising: a first substrate layer; a functional layer comprising silver; a first blocker layer comprising a corrosion resistant material; and a second blocker layer comprising NiCr, wherein the second blocker layer is adjacent to the first blocker layer; and wherein the composite stack has an emissivity of not greater than about 20%.

Embodiment 3

A method of forming composite stack comprising: providing a first substrate layer; forming a function layer comprising silver; forming a first blocker layer comprising a corrosion resistant material; and forming a second blocker layer comprising NiCr, wherein the second blocker layer is adjacent to the first blocker layer; wherein the composite stack has a VLT of at least about 50% and a TSER of at least about 30%.

Embodiment 4

The composite stack or method of any of the previous embodiments, wherein the first substrate comprises a polymer material, wherein the first substrate comprises a glass substrate; wherein the first substrate consists of a polymer material; wherein the first substrate consists of a glass substrate.

Embodiment 5

The composite stack or method of any of the previous embodiments, wherein the corrosion resistant material comprises any one of any noble or precious metal, wherein the corrosion material comprises Ruthenium, Rhodium, Palladium, Silver, Osmium, Iridium, Platinum or Gold.

Embodiment 6

The composite stack or method of any of the previous embodiments, wherein the first blocker layer consists of Gold, consists of Platinum.

Embodiment 7

The composite stack or method of any of the previous embodiments, wherein the composite stack comprises a VLT of at least about 10%, at least about 20%, at least about 30%, at least about 40%, at least about 50%, at least about 60%, at least about 70%, at least about 75%, at least about 80%, at least about 85% and at least about 90%.

Embodiment 8

The composite stack or method of any of the previous embodiments, wherein the composite stack comprises a VLT of not greater than about 99%.

Embodiment 9

The composite stack or method of any of the previous embodiments, wherein the composite stack comprises a TSER of at least about at least about 30%, at least about 40%, at least about 50%, at least about 60%, at least about 70%, at least about 80% and at least about 85%.

Embodiment 10

The composite stack or method of any of the previous embodiments, wherein the functional layer comprises silver, consists of silver.

Embodiment 11

The composite stack or method of any of the previous embodiments, wherein the functional layer has a thickness of at least about 5 nanometers, at least about 6 nanometers, at least about 7 nanometers, at least about 8 nanometers, at least about 9 nanometers, at least about 10 nanometers, at least about 12 nanometers, at least about 14 nanometers, at least about 16 nanometers, at least about 18 nanometers, at least about 20 nanometers, at least about 25 nanometers, at least about 30 nanometers and at least about 35 nanometers.

Embodiment 12

The composite stack or method of any of the previous embodiments, wherein the functional layer has a thickness of not greater than about 40 nanometers, not greater than about 39 nanometers, not greater than about 38 nanometers, not greater than about 37 nanometers, not greater than about 36 nanometers, not greater than about 35 nanometers, not greater than about 34 nanometers, not greater than about 33 nanometers, not greater than about 32 nanometers and not greater than about 31 nanometers.

Embodiment 13

The composite stack or method of any of the previous embodiments, wherein the functional layer has an emissivity of not greater than about 20%, not greater than about 18%, not greater than about 15%, not greater than about 13%, not greater than about 13%, not greater than about 10%, not greater than about 9%, not greater than about 8%, not greater than about 7%, not greater than about 6% and not greater than about 5%.

Embodiment 14

The composite stack or method of any of the previous embodiments, wherein the first blocker layer has a thickness of not greater than about 10 nanometers, not greater than about 9 nanometers, not greater than about 8 nanometers, not greater than about 7 nanometers, not greater than about 6 nanometers, not greater than about 5 nanometers, not greater than about 4.5 nanometers, not greater than about 4 nanometers, not greater than about 3.5 nanometers, not greater than about 3 nanometers, not greater than about 2.8 nanometers, not greater than about 2.6 nanometers, not greater than about 2.4 nanometers, not greater than about 2.2 nanometers, not greater than about 2.0 nanometers, not greater than about 1.8 nanometers, not greater than about 1.6 nanometers, not greater than about 1.4 nanometers, not greater than about 1.2 nanometers, not greater than about 1.0 nanometers, not greater than about 0.8 nanometers, not greater than about 0.6 nanometers, not greater than about 0.5 nanometers, not greater than about 0.4 nanometers, not greater than about 0.3 nanometers and not greater than about 0.2 nanometers.

Embodiment 15

The composite stack or method of any of the previous embodiments, wherein the first blocker layer has a thickness of at least about 0.1 nanometers, at least about 0.2 nanometers, at least about 0.3 nanometers and at least about 0.4 nanometers.

Embodiment 16

The composite stack or method of any of the previous embodiments, wherein the composite stack further comprises a thickness ratio $TH_{BL1}/TH_{FL}$ of not greater than about 5, where $TH_{BL1}$ is the thickness of the first blocker layer and $TH_{FL}$ is the thickness of the function layer, not greater than about 4, not greater than about 3, not greater than about 2, not greater than about 1, not greater than about 0.9, not greater than about 0.8, not greater than about 0.7, not greater than about 0.6, not greater than about 0.5, not greater than about 0.4, not greater than about 0.3, not greater than about 0.35, not greater than about 0.3, not greater than about 0.25, not greater than about 0.2, not greater than about 0.15, not greater than about 0.1, not greater than about 0.05, not greater than about 0.04, not greater than about 0.03, not greater than about 0.02, even not greater than about 0.01 and not greater than about 0.005.

Embodiment 17

The composite stack or method of any of the previous embodiments, wherein the composite stack further comprises a thickness ratio $TH_{BL1}/TH_{FL}$ of at least about 0.002, where $TH_{BL1}$ is the thickness of the first blocker layer and $TH_{FL}$ is the thickness of the function layer, at least about 0.005, at least about 0.01, at least about 0.02, at least about 0.03, at least about 0.04, at least about 0.05, at least about 0.06, at least about 0.07, at least about 0.08, at least about 0.09, at least about 0.1, at least about 0.2, at about 0.4 and at least about 0.5.

Embodiment 18

The composite stack or method of any of the previous embodiments, wherein the first blocker layer is adjacent to the functional layer, wherein the first blocker layer is between the functional layer and the first substrate layer.

Embodiment 19

The composite stack or method of any of the previous embodiments, wherein the second blocker layer comprises a material having a standard potential that is less stable than silver, wherein the second blocker layer comprises NiCr.

Embodiment 20

The composite stack or method of any of the previous embodiments, wherein the second blocker layer has a thickness of not greater than about 10 nanometers, not greater than about 9 nanometers, not greater than about 8 nanometers, not greater than about 7 nanometers, not greater than about 6 nanometers, not greater than about 5 nanometers, not greater than about 4.5 nanometers, not greater than about 4 nanometers, not greater than about 3.5 nanometers, not greater than about 3 nanometers, not greater than about 2.8 nanometers, not greater than about 2.6 nanometers, not greater than about 2.4 nanometers, not greater than about 2.2 nanometers, not greater than about 2.0 nanometers, not greater than about 1.8 nanometers, not greater than about 1.6 nanometers, not greater than about 1.4 nanometers, not greater than about 1.2 nanometers, not greater than about 1.0 nanometers, not greater than about 0.8 nanometers, not greater than about 0.6 nanometers, not greater than about 0.5 nanometers, not greater than about 0.4 nanometers, not greater than about 0.3 nanometers and not greater than about 0.2 nanometers.

Embodiment 21

The composite stack or method of any of the previous embodiments, wherein the second blocker layer has a thickness of at least about 0.1 nanometers, at least about 0.2 nanometers, at least about 0.3 nanometers and at least about 0.4 nanometers.

Embodiment 22

The composite stack or method of any of the previous embodiments, wherein the composite stack further comprises a thickness ratio $TH_{BL2}/TH_{FL}$ of not greater than about 5, where $TH_{BL2}$ is the thickness of the second blocker layer and $TH_{FL}$ is the thickness of the function layer, not greater than about 4, not greater than about 3, not greater than about 2, not greater than about 1, not greater than about 0.9, not greater than about 0.8, not greater than about 0.7, not greater than about 0.6, not greater than about 0.5, not greater than about 0.4, not greater than about 0.3, not greater than about 0.35, not greater than about 0.3, not greater than about 0.25, not greater than about 0.2, not greater than about 0.15, not greater than about 0.1, not greater than about 0.05, not greater than about 0.04, not greater than about 0.03, not greater than about 0.02, even not greater than about 0.01 and not greater than about 0.005.

Embodiment 23

The composite stack or method of any of the previous embodiments, wherein the composite stack further comprises a thickness ratio $TH_{BL2}/TH_{FL}$ of at least about 0.002, where $TH_{BL2}$ is the thickness of the second blocker layer and $TH_{FL}$ is the thickness of the function layer, at least about 0.005, at least about 0.01, at least about 0.02, at least about 0.03, at least about 0.04, at least about 0.05, at least about 0.06, at least about 0.07, at least about 0.08, at least about 0.09, at least about 0.1, at least about 0.2, at about 0.4 and at least about 0.5.

Embodiment 24

The composite stack or method of any of the previous embodiments, wherein the second blocker layer is adjacent to the functional layer, wherein the second blocker layer is between the functional layer and the first polymer substrate layer.

Embodiment 25

The composite stack or method of any of the previous embodiments, wherein the third blocker layer comprises any noble or precious metal, Ruthenium, Rhodium, Palladium, Silver, Osmium, Iridium, Platinum, Gold.

Embodiment 26

The composite stack or method of any of the previous embodiments, wherein the third blocker layer has a thickness of not greater than about 10 nanometers, not greater than about 9 nanometers, not greater than about 8 nanometers, not greater than about 7 nanometers, not greater than about 6 nanometers, not greater than about 5 nanometers, not greater than about 4.5 nanometers, not greater than about 4 nanometers, not greater than about 3.5 nanometers, not greater than about 3 nanometers, not greater than about 2.8 nanometers, not greater than about 2.6 nanometers, not greater than about 2.4 nanometers, not greater than about 2.2 nanometers, not greater than about 2.0 nanometers, not greater than about 1.8 nanometers, not greater than about 1.6 nanometers, not greater than about 1.4 nanometers, not greater than about 1.2 nanometers, not greater than about 1.0 nanometers, not greater than about 0.8 nanometers, not greater than about 0.6 nanometers, not greater than about 0.5 nanometers, not greater than about 0.4 nanometers, not greater than about 0.3 nanometers and not greater than about 0.2 nanometers.

Embodiment 27

The composite stack or method of any of the previous embodiments, wherein the third blocker layer has a thickness of at least about 0.1 nanometers, at least about 0.2 nanometers, at least about 0.3 nanometers and at least about 0.4 nanometers.

Embodiment 28

The composite stack or method of any of the previous embodiments, wherein the composite stack further comprises a thickness ratio $TH_{BL3}/TH_{FL}$ of not greater than about 5, where $TH_{BL3}$ is the thickness of the third blocker layer and $TH_{FL}$ is the thickness of the function layer.

Embodiment 29

The composite stack or method of any of the previous embodiments, wherein the composite stack further comprises a thickness ratio $TH_{BL3}/TH_{FL}$ of at least about 0.002, where $TH_{BL3}$ is the thickness of the third blocker layer and $TH_{FL}$ is the thickness of the function layer.

Embodiment 30

The composite stack or method of any of the previous embodiments, wherein the third blocker layer is adjacent to the functional layer.

Embodiment 31

The composite stack or method of any of the previous embodiments, wherein the fourth blocker layer comprises any noble or precious metal, Ruthenium, Rhodium, Palladium, Silver, Osmium, Iridium, Platinum, Gold.

Embodiment 32

The composite stack or method of any of the previous embodiments, wherein the fourth blocker layer has a thickness of not greater than about 10 nanometers, not greater than about 9 nanometers, not greater than about 8 nanometers, not greater than about 7 nanometers, not greater than about 6 nanometers, not greater than about 5 nanometers, not greater than about 4.5 nanometers, not greater than about 4 nanometers, not greater than about 3.5 nanometers, not greater than about 3 nanometers, not greater than about 2.8 nanometers, not greater than about 2.6 nanometers, not greater than about 2.4 nanometers, not greater than about 2.2 nanometers, not greater than about 2.0 nanometers, not greater than about 1.8 nanometers, not greater than about 1.6 nanometers, not greater than about 1.4 nanometers, not greater than about 1.2 nanometers, not greater than about 1.0 nanometers, not greater than about 0.8 nanometers, not greater than about 0.6 nanometers, not greater than about 0.5 nanometers, not greater than about 0.4 nanometers, not greater than about 0.3 nanometers and not greater than about 0.2 nanometers.

Embodiment 33

The composite stack or method of any of the previous embodiments, wherein the fourth blocker layer has a thickness of at least about 0.1 nanometers, at least about 0.2 nanometers, at least about 0.3 nanometers and at least about 0.4 nanometers.

Embodiment 34

The composite stack or method of any of the previous embodiments, wherein the composite stack further comprises a thickness ratio $TH_{BL4}/TH_{FL}$ of not greater than about 5, where $TH_{BL4}$ is the thickness of the fourth blocker layer and $TH_{FL}$ is the thickness of the function layer.

Embodiment 35

The composite stack or method of any of the previous embodiments, wherein the composite stack further comprises a thickness ratio $TH_{BL4}/TH_{FL}$ of at least about 0.002, where $TH_{BL4}$ is the thickness of the fourth blocker layer and $TH_{FL}$ is the thickness of the function layer.

Embodiment 36

The composite stack or method of any of the previous embodiments, wherein the fourth blocker layer is adjacent to the third blocker layer, adjacent to the functional layer.

Embodiment 37

The composite stack or method of any of the previous embodiments, wherein the composite stack further comprises a first dielectric layer.

Embodiment 38

The composite stack or method of any of the previous embodiments, wherein the first dielectric layer comprises ITO, SnZnO, $SiO_2$, $Si_3N_4$, $Nb_2O_5$, $TiO_2$, $TiO_x$, $In_2O_3$ or AZO.

Embodiment 39

The composite stack or method of any of the previous embodiments, wherein the first dielectric layer has a thickness of not greater than about 100 nanometers.

Embodiment 40

The composite stack or method of any of the previous embodiments, wherein the first dielectric layer has a thickness of at least about 3 nanometers.

Embodiment 41

The composite stack or method of any of the previous embodiments, wherein the first dielectric layer is between the second blocker layer and the first polymer substrate.

Embodiment 42

The composite stack or method of any of the previous embodiments, wherein the composite stack further comprises a second dielectric layer.

Embodiment 43

The composite stack or method of any of the previous embodiments, wherein the second dielectric layer comprises ITO, SnZnO, $SiO_2$, $Si_3N_4$, $Nb_2O_5$, $TiO_2$, $TiO_x$, $In_2O_3$ or AZO.

Embodiment 44

The composite stack or method of any of the previous embodiments, wherein the second dielectric layer has a thickness of not greater than about 100 nanometers.

Embodiment 45

The composite stack or method of any of the previous embodiments, wherein the second dielectric layer has a thickness of at least about 3 nanometers.

Embodiment 46

The composite stack or method of any of the previous embodiments, wherein the second dielectric layer is between the second blocker layer and the first polymer substrate.

Embodiment 47

The composite stack or method of any of the previous embodiments, wherein the first substrate layer comprises PET, consists of PET.

Embodiment 48

The composite stack or method of any of the previous embodiments, wherein the composite stack further comprises a second substrate layer, wherein the second substrate layer is a glass layer, wherein the second substrate layer is a polymer substrate layer.

Embodiment 49

The composite stack or method of any of the previous embodiments, wherein the second substrate layer comprises PET, consists of PET.

Examples

The concepts described herein will be further described in the following Examples, which do not limit the scope of the invention described in the claims.

Sample Composite Stacks

Six sample composite stacks (S1-S6) were configured and formed according to certain embodiments described herein. All six sample composite stacks (S1-S6) include a first substrate layer, a first (i.e., bottom) dielectric layer and a second (i.e., top) dielectric layer. The configuration of layers in each stack located between the bottom and top dielectric layers, including general layer composition, arrangement and thickness, are summarized below in Table 1. It will be appreciated that the order of the layers listed in Table 1 indicates the order of the layers in the composite stack with the bottom row in the table corresponding to the bottom layer in the composite stack.

TABLE 1

Sample Composite Stack Configurations

|  | S1 | S2 | S3 | S4 | S5 | S6 |
|---|---|---|---|---|---|---|
| NiCr (nm) | NA | NA | NA | 0.5 | 0.5 | 0.5 |
| Au (nm) | 0.25 | 0.5 | 1.0 | 0.25 | 0.5 | 1.0 |
| Ag (nm) | 9.5 | 9.0 | 8.0 | 9.5 | 9.0 | 8.0 |
| Au (nm) | 0.25 | 0.5 | 1.0 | 0.25 | 0.5 | 1.0 |
| NiCr (nm) | 0.5 | 0.5 | 0.5 | 0.5 | 0.5 | 0.5 |

* Boxes marked as NA indicate no corresponding layer in stack.

Performance of each sample composite stack was evaluated using a 10 Day BSN test and using a 21 Day BSN test. BSN Tests were conducted according to standard EN10962. In particular, the BSN Duration Test consists of exposing coated layers to a humid and salty (neutral) atmosphere at a constant temperature. The coated layers to be tested are deposited on a flexible PET substrate, and this substrate is laminated to a glass support throughout the duration of the test. The samples (size 100 mm×100 mm) are placed inside the chamber evenly spread out at 20 mm≤distance≤40 mm (between each sample) with an inclination of 15°+/−5° with respect to the vertical axis. The side with the coated layers should be facing upwards, or towards the door of the chamber. The machine designed for this test should have a chamber with total volume superior to 0.4 m3. The salt level inside the chamber must be automatically controlled in order to guarantee uniformity in salt concentration and temperature at 50 g/l+/−5 g/l at 25° C.+/−2° C. throughout the test duration. The temperature should be measured at least 100 mm from the walls of the chamber. The pH of the salt spray should be neutral. The chamber must be started and conditioned to test equilibrium conditions at least 24 h before sample introduction. No neutral salt water (typically accumulated along the edges and side walls of the machine) should be allowed to drip directly onto the sample surface.

The overall thickness of the layers in each sample composite stack (S1-S6) were configured to produce a VLT of 70% for each sample composite stack. It will be appreciated that the relative thickness of the functional layer and blocker layers in each sample composite stack may be adjusted as described herein such that the composite stack may achieve any desired VLT within a range from about 10% to about 99%.

Recorded performance measurements include sheet resistance evolution (ΔRsq) and visible reflection evolution (ΔRL). Results are provided below in Table 2.

TABLE 2

Sample Composite Stack Performance Measurements

|  |  | S1 | S2 | S3 | S4 | S5 | S6 |
|---|---|---|---|---|---|---|---|
| 10 Day | ΔRsq (Ω/□) | 0.25 | 0.29 | 0.24 | 0.73 | 0.38 | 0.24 |
|  | ΔRL (%) | −0.06 | −0.17 | −0.05 | −0.07 | −0.05 | −0.01 |
| 21 Day | ΔRsq (Ω/□) | 0.41 | 0.42 | 0.54 | 0.32 | 0.22 | NO DATA |
|  | ΔRL (%) | −0.15 | −0.21 | 0.11 | −0.11 | −0.21 | NO DATA |

As shown in Table 2, Samples S1-S6 showed no increase in sheet resistance or visible light reflection evolution after 10 days. As further shown in Table 2, Samples S1-S6 showed only limited increase in sheet resistance or visible light reflection evolution after 21 days.

Performance of each sample composite stack was also evaluated through visual evaluation of optical microscopy images of the surface of each sample composite stack.

Figure 7A:
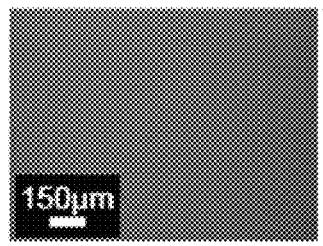
FIGS. 7a-7f includes microscopy images of the surface of example composite stacks according to embodiments described herein after a 10 day BSN durability test.
Figure 7B:
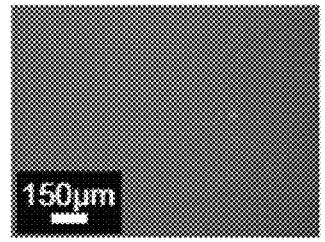
Figure 7C:
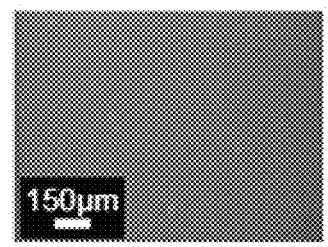
Figure 7D:
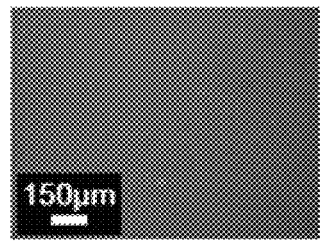
Figure 7E:
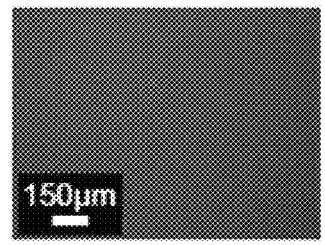
Figure 7F:
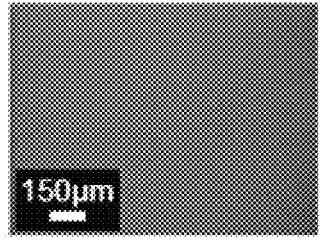

FIG. 7a includes an image of the surface of Sample S1 after a 10 Day BSN test. FIG. 7b includes an image of the surface of Sample S2 after a 10 Day BSN test. FIG. 7c includes an image of the surface of Sample S3 after a 10 Day BSN test. FIG. 7d includes an image of the surface of Sample S4 after a 10 Day BSN test. FIG. 7e includes an image of the surface of Sample S5 after a 10 Day BSN test. FIG. 7f includes an image of the surface of Sample S6 after a 10 Day BSN test.

As shown in FIGS. 7a-7f, Samples S1-S6 showed no signs of cracks, no delamination and virtually no corrosion points on the optical images.

Figure 8A:
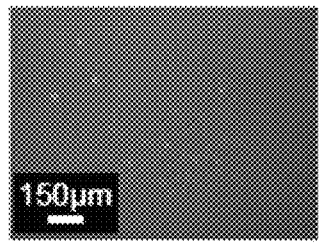
FIGS. 8a-8e includes microscopy images of the surface of example composite stacks according to embodiments described herein after a 21 day BSN durability test.
Figure 8B:
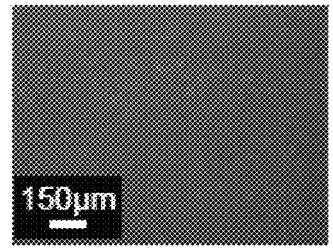
Figure 8C:
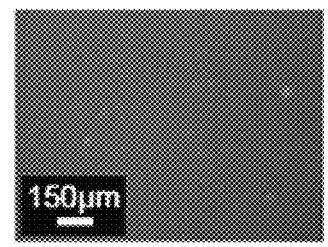
Figure 8D:
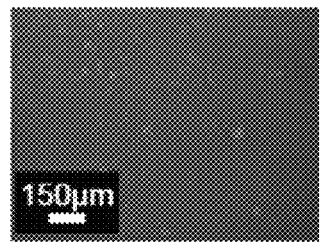
Figure 8E:
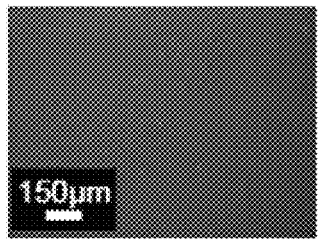

FIG. 8a includes an image of the surface of Sample S1 after a 21 Day BSN test. FIG. 8b includes an image of the surface of Sample S2 after a 21 Day BSN test. FIG. 8c includes an image of the surface of Sample S3 after a 21 Day BSN test. FIG. 8d includes an image of the surface of Sample S4 after a 21 Day BSN test. FIG. 8e includes an image of the surface of Sample S5 after a 21 Day BSN test.

As shown in FIGS. 8a-8e, Samples S1-S5 again showed no signs of cracks, no delamination and only small corrosion points on the optical images.

Comparative Sample Composite Stacks

Nine comparative sample composite stack stacks (CS1-CS9) were made according to the method described above. All nine sample comparative sample composite stacks (CS1-CS9) include a first substrate layer, a first (i.e., bottom) dielectric layer and a second (i.e., top) dielectric layer. The configuration of layers in each stack located between the bottom and top dielectric layers, including general layer composition, arrangement and thickness are summarized below in Table 3. It will be appreciated that the order of the layers listed in the Table indicates the order of the layers in the comparative composite stack with the bottom row in the table corresponding to the bottom layer in the comparative composite stack.

TABLE 3

Comparative Sample Stack Configurations

|  | CS1 | CS2 | CS3 | CS4 | CS5 | CS6 | CS7 | CS8 | CS9 |
|---|---|---|---|---|---|---|---|---|---|
| NiCr (nm) | NA | NA | NA | NA | NA | NA | NA | NA | NA |
| Au (nm) | 0.5 | 1.0 | 2.0 | 0.25 | 0.5 | 1.0 | 0.5 | 1.0 | 2.0 |

TABLE 3-continued

Comparative Sample Stack Configurations

|  | CS1 | CS2 | CS3 | CS4 | CS5 | CS6 | CS7 | CS8 | CS9 |
|---|---|---|---|---|---|---|---|---|---|
| Ag (nm) | 9.5 | 9.0 | 8.0 | 9.5 | 9.0 | 8.0 | 9.5 | 9.0 | 8.0 |
| Au (nm) | NA | NA | NA | 0.25 | 0.5 | 1.0 | NA | NA | NA |
| NiCr (nm) | NA | NA | NA | NA | NA | NA | 0.5 | 0.5 | 0.5 |

\* Boxes marked as NA indicate no corresponding layer in stack.

Performance of each sample composite stack was evaluated using a 10 Day BSN test and using a 21 Day BSN test. BSN Tests we conducted according to standard EN10962 and as described above. Performance measurements include sheet resistance ($\Delta Rsq$) and visible reflection evolution ($\Delta RL$). Results are provided below in Table 4.

TABLE 4

Comparative Sample Composite Stack Performance Measurements

|  |  | CS1 | CS2 | CS3 | CS4 | CS5 | CS6 | CS7 | CS8 | CS9 |
|---|---|---|---|---|---|---|---|---|---|---|
| 10 Day | $\Delta Rsq$ ($\Omega$) | 140.72 | 2.83 | 2.87 | 0.43 | 0.35 | 0.4 | 0.63 | 0.63 | 0.95 |
|  | $\Delta RL$ (%) | 13.74 | 1.34 | 0.09 | 0.2 | −0.25 | −0.09 | 0.31 | 0.06 | −0.11 |
| 21 Day | $\Delta Rsq$ ($\Omega$) | NMP | NMP | NMP | 2.38 | 0.87 | 0.97 | NMP | NMP | NMP |
|  | $\Delta RL$ (%) | NMP | NMP | NMP | 0.57 | 0.06 | 0.28 | NMP | NMP | NMP |

\* NMP indicates that sample was so damaged that measurements were not possible

Performance of certain comparative sample composite stack stacks was also evaluated through visual evaluation of optical microscopy images of the surface of the comparative sample composite stack.

Figure 9A:
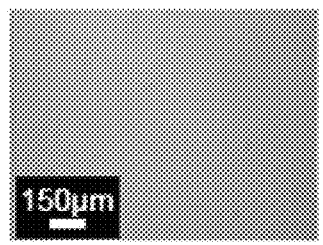
FIGS. 9a-9i includes microscopy images of the surface of comparative example composite stacks after a 10 day BSN durability test.
Figure 9B:
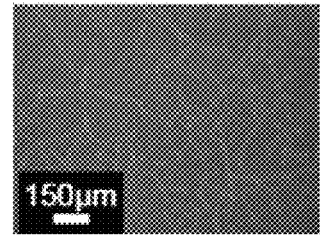
Figure 9C:
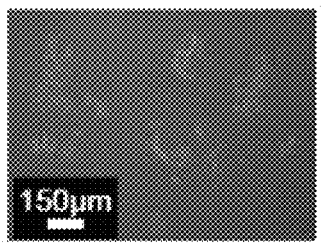
Figure 9D:
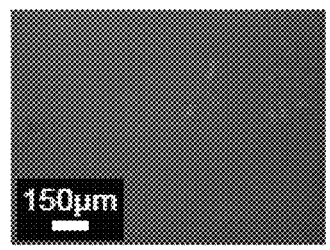
Figure 9E:
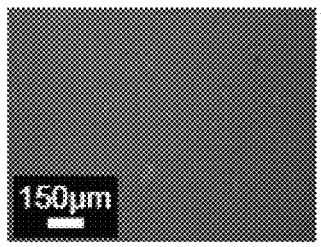
Figure 9F:
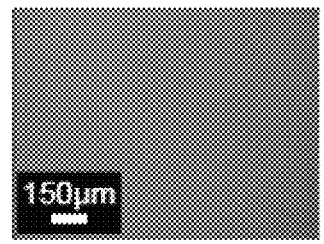
Figure 9G:
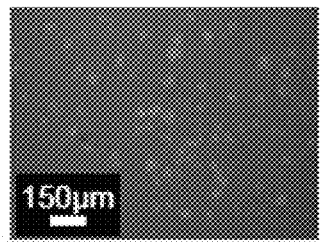
Figure 9H:
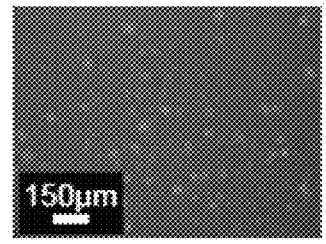
Figure 9I:
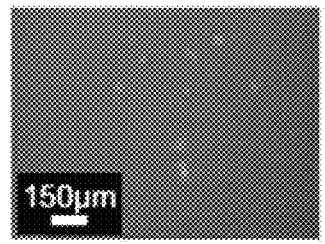

FIG. 9a includes an image of the surface of CS1 after a 10 Day BSN test. FIG. 9b includes an image of the surface of CS2 after a 10 Day BSN test. FIG. 9c includes an image of the surface of CS3 after a 10 Day BSN test. FIG. 9d includes an image of the surface of CS4 after a 10 Day BSN test. FIG. 9e includes an image of the surface of CS5 after a 10 Day BSN test. FIG. 9f includes an image of the surface of CS6 after a 10 Day BSN test. FIG. 9g includes an image of the surface of CS7 after a 10 Day BSN test. FIG. 9h includes an image of the surface of CS8 after a 10 Day BSN test. FIG. 9i includes an image of the surface of CS9 after a 10 Day BSN test.

As shown when FIGS. 9a-9i are compared to FIGS. 7a-7f, Samples CS1-CS9 showed increased signs of cracks, increased delamination and increased corrosion point size on the optical images after 10 days when compared to sample composite stacks (S1-S6) formed according to embodiments described herein.

Figure 10A:
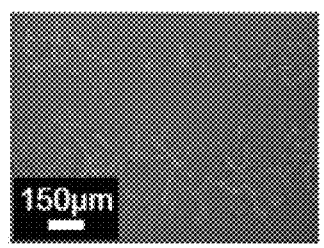
FIGS. 10a-10c includes microscopy images of the surface of comparative example composite stacks after a 21 day BSN durability test.
Figure 10B:
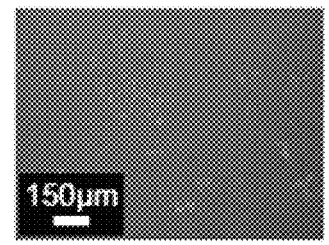
Figure 10C:
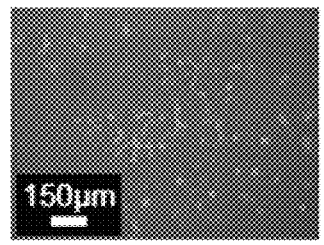

FIG. 10a includes an image of the surface of CS4 after a 21 Day BSN test. FIG. 10b includes an image of the surface of CS5 after a 21 Day BSN test. FIG. 10c includes an image of the surface of CS6 after a 21 Day BSN test.

Again as shown when FIGS. 10a-10c are compared to FIGS. 8a-8e, Samples CS4-CS6 showed increased signs of cracks, increased delamination and increased corrosion point size on the optical images after 21 days when compared to sample composite stacks (S1-S6) formed according to embodiments described herein.

The foregoing embodiments represent a departure from the state-of-the-art. Notably, the composite safety stacks of the embodiments herein include a combination of features not previously recognized in the art and facilitate performance improvements. Such features can include, but are not limited to, particular configurations of layers within the composite stacks, including the use of a dual blocker structure or stack that includes a blocker layer that includes a blocker material selected from any one of Ti, Ni, Cr, Cu, Al, Mg, NiCr, or alloys thereof and is adjacent to a corrosion resistant blocker layer. The composite stack embodiments described herein have demonstrated remarkable and unexpected improvements over state-of-the-art composite stacks. In particular, they have shown improved protection and durability performance while meeting required VLT and TSER transmission in combination with low-emissivity characteristics.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite stack comprising:
   a first substrate layer;
   a functional layer comprising silver;
   a first blocker layer comprising Ruthenium, Rhodium, Osmium, Iridium, Platinum or Gold; and
   a second blocker layer comprising NiCr,
   wherein the first blocker layer is adjacent to the functional layer;

wherein the second blocker layer is adjacent to the first blocker layer;

wherein the second blocker layer has a thickness of at least about 0.1 nm and not greater than about 10 nm; and wherein the composite stack has a VLT of at least 72% and a TSER of at least about 30%.

2. The composite stack of claim 1, wherein the first substrate comprises a polymer material.

3. The composite stack of claim 1, wherein the first blocker layer consists of Gold.

4. The composite stack of claim 1, wherein the composite stack comprises a VLT of not greater than about 99%.

5. The composite stack of claim 1, wherein the composite stack comprises a TSER of at least about at least about 40%.

6. The composite stack of claim 1, wherein the functional layer consists of silver.

7. The composite stack of claim 1, wherein the functional layer has a thickness of at least about 5 nanometers.

8. The composite stack of claim 1, wherein the functional layer has a thickness of not greater than about 40 nanometers.

9. The composite stack of claim 1, wherein the composite stack has an emissivity of not greater than about 20%.

10. The composite stack of claim 1, wherein the first blocker layer has a thickness of not greater than about 10 nanometers.

11. The composite stack of claim 1, wherein the first blocker layer has a thickness of at least about 0.1 nanometers.

12. A composite stack comprising:
a first substrate layer;
a functional layer comprising silver;
a first blocker layer comprising Ruthenium, Rhodium, Osmium, Iridium, Platinum or Gold; and
a second blocker layer comprising NiCr,
wherein the first blocker layer is adjacent to the functional layer;
wherein the second blocker layer is adjacent to the first blocker layer;
wherein the second blocker layer has a thickness of at least about 0.1 nm and not greater than about 10 nm;
wherein the composite stack has a VLT of at least 72%, and
wherein the composite stack has an emissivity of not greater than about 20%.

13. A method of forming composite stack comprising:
providing a first substrate layer;
forming a function layer comprising silver;
forming a first blocker layer comprising Ruthenium, Rhodium, Osmium, Iridium, Platinum or Gold; and
forming a second blocker layer comprising NiCr,
wherein the first blocker layer is adjacent to the functional layer;
wherein the second blocker layer is adjacent to the first blocker layer;
wherein the second blocker layer has a thickness of at least about 0.1 nm and not greater than about 10 nm;
wherein the composite stack has a VLT of at least 72% and a TSER of at least about 30%.

14. The method of claim 13, wherein the first substrate comprises a polymer material.

15. The method of claim 13, wherein the first blocker layer consists of Gold.

16. The method of claim 13, wherein the composite stack comprises a VLT of not greater than about 99%.

17. The method of claim 13, wherein the composite stack comprises a TSER of at least about at least about 40%.

18. The method of claim 13, wherein the functional layer consists of silver.

* * * * *

UNITED STATES PATENT AND TRADEMARK OFFICE
CERTIFICATE OF CORRECTION

| | |
|---|---|
| PATENT NO. | : 10,591,653 B2 |
| APPLICATION NO. | : 15/422618 |
| DATED | : March 17, 2020 |
| INVENTOR(S) | : Noémie Chocat |

It is certified that error appears in the above-identified patent and that said Letters Patent is hereby corrected as shown below:

In the Specification

Column 4, Line 43, please delete "micron", and insert --microns--

Column 23, Line 46, please delete "0.4 m3.", and insert --0.4 $m^3$.--

Column 24, Line 62, please delete "CSS", and insert --CS5--

Column 25, Line 4, please delete "CSS", and insert --CS5--

In the Claims

Column 28, Line 33, please delete "of at least about at least about 40%.", and insert --of at least about 40%.--

Signed and Sealed this
Nineteenth Day of April, 2022

Katherine Kelly Vidal
*Director of the United States Patent and Trademark Office*